US011220273B2

(12) United States Patent
Ochida et al.

(10) Patent No.: US 11,220,273 B2
(45) Date of Patent: Jan. 11, 2022

(54) VEHICLE CONTROL APPARATUS AND VEHICLE CONTROL METHOD

(71) Applicant: HONDA MOTOR CO., LTD., Tokyo (JP)

(72) Inventors: Jun Ochida, Wako (JP); Hiroyuki Nakashima, Tokyo (JP); Jun Ibuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/160,496

(22) Filed: Jan. 28, 2021

(65) Prior Publication Data
US 2021/0237751 A1  Aug. 5, 2021

(30) Foreign Application Priority Data

Feb. 5, 2020 (JP) .............................. JP2020-018182

(51) Int. Cl.
*B60W 50/029* (2012.01)
*B60W 50/035* (2012.01)

(52) U.S. Cl.
CPC ........ *B60W 50/029* (2013.01); *B60W 50/035* (2013.01); *B60W 2050/0292* (2013.01)

(58) Field of Classification Search
CPC ............. B60W 50/029; B60W 50/035; B60W 2050/0292
USPC ....................................................... 701/29.2
See application file for complete search history.

(56) References Cited

U.S. PATENT DOCUMENTS

| 9,682,711 | B2 * | 6/2017 | Lee ........................ B60W 40/09 |
| 9,688,288 | B1 * | 6/2017 | Lathrop ............... G05D 1/0061 |
| 9,904,286 | B2 * | 2/2018 | Kozak .................. G05D 1/0061 |
| 10,300,930 | B2 * | 5/2019 | Lathrop ............... G05D 1/0061 |

(Continued)

FOREIGN PATENT DOCUMENTS

| EP | 2783904 A2 | 10/2014 |
| JP | 2014-184869 A | 10/2014 |

(Continued)

OTHER PUBLICATIONS

Japanese Office Action for Japanese Patent Application 2020-018182 dated Jun. 4, 2021.

(Continued)

*Primary Examiner* — Muhammad Shafi
(74) *Attorney, Agent, or Firm* — Thomas | Horstemeyer, LLP (57) ABSTRACT

The present invention provides a vehicle control apparatus that controls automated driving of a vehicle, comprising: a first travel controller configured to control travel of the vehicle; a second travel controller configured to control travel of the vehicle based on an instruction from the first travel controller; a first controller configured to control a first actuator based on an instruction from the first travel controller; and a second controller configured to control a second actuator based on an instruction from the second travel controller, wherein in a case in which degradation of a communication function between the first travel controller and the second travel controller is detected in a state where the actuator group is performed by the second controller, alternative control of the vehicle is performed by the second travel controller.

8 Claims, 8 Drawing Sheets

(56) References Cited

U.S. PATENT DOCUMENTS

| | | | |
|---|---|---|---|
| 10,768,619 B1* | 9/2020 | Szybalski | B60W 10/18 |
| 2015/0142244 A1* | 5/2015 | You | B60W 60/0053 |
| | | | 701/23 |
| 2015/0241878 A1* | 8/2015 | Crombez | B60W 30/12 |
| | | | 701/23 |
| 2017/0259832 A1* | 9/2017 | Lathrop | G05D 1/0061 |
| 2018/0170389 A1* | 6/2018 | Ochida | B60W 30/18163 |
| 2018/0173226 A1* | 6/2018 | Ochida | G05D 1/0061 |
| 2019/0256093 A1* | 8/2019 | Horii | B60W 50/023 |
| 2020/0017124 A1* | 1/2020 | Camhi | G06N 20/00 |
| 2020/0298871 A1 | 9/2020 | Mukai et al. | |
| 2021/0163026 A1 | 6/2021 | Ochida et al. | |

FOREIGN PATENT DOCUMENTS

| | | | | |
|---|---|---|---|---|
| JP | 2018158591 A | 10/2018 | | |
| JP | 2018160710 A | 10/2018 | | |
| WO | WO-2018105058 A1 * | 6/2018 | | G08G 1/09 |
| WO | 2019/116870 A1 | 6/2019 | | |
| WO | WO-2019116870 * | 6/2019 | | G08G 1/16 |
| WO | 2018/220811 A1 | 12/2019 | | |

OTHER PUBLICATIONS

Decision to Grant for Japanese Patent Application 2020-018182 dated Aug. 10, 2021.
Japanese Office Action in co-pending, related JP Application No. JP 2020-018182,dated Jun. 4, 2021.
Partial English translation of the Office Action dated Jun. 4, 2021,concerning Japanese Patent Application No. 2020-018182.

* cited by examiner

VEHICLE CONTROL APPARATUS AND VEHICLE CONTROL METHOD

CROSS-REFERENCE TO RELATED APPLICATION(S)

This application claims priority to and the benefit of Japanese Patent Application No. 2020-018182 filed on Feb. 5, 2020, the entire disclosure of which is incorporated herein by reference.

BACKGROUND OF THE INVENTION

Field of the Invention

The present invention relates to a vehicle control technique.

Description of the Related Art

Various kinds of techniques for implementing automated driving of a vehicle have been proposed. International Publication No. 2019/116870 discloses that a first travel control means and a second travel control means, each capable of performing travel control of a vehicle, will be arranged, and in a case in which functional degradation is detected in one of these travel control means, alternative control will be performed by the other travel control means. By providing a redundant arrangement in which a plurality of travel control means are arranged in a vehicle in this manner, the reliability of the automated driving control of the vehicle is improved.

Consider a case in which the first travel control means will perform travel control during a normal state and the other second travel control means will perform travel control during a state of functional degradation of the first travel control means in a vehicle which has an redundant arrangement. In this case, the travel control means will mutually monitor their respective operation states to determine which travel control means is to perform the travel control operation. However, if the second travel control means erroneously determines, due to a reason such as communication failure or the like, that the function of the first travel control means has degraded even though the first travel control means is operating normally, the second travel control means will start performing the alternative control operation. As a result, travel control will be performed by both the first travel control means and the second travel control means, and wasteful control operations will be performed.

SUMMARY OF THE INVENTION

The present invention suppresses, for example, simultaneous execution of travel control operations by travel controller in a vehicle with a redundant arrangement.

According to one aspect of the present invention, there is provided a vehicle control apparatus that controls automated driving of a vehicle, comprising: a first travel controller configured to control steering and acceleration/deceleration of the vehicle, and perform travel control of the vehicle; a second travel controller configured to perform recognition of a peripheral travel environment of the vehicle and travel support of the vehicle; a first controller configured to control a first actuator based on an instruction from the first travel controller; and a second controller configured to control a second actuator based on an instruction from the second travel controller, wherein the first controller gives, to the second controller, notification for switching a control state from control of the first actuator by the first controller to control of the second actuator by the second controller, in a case where the instruction from the first travel controller cannot be received, and wherein the second travel controller performs alternative control of the vehicle, in a case of detecting degradation of a communication function with the first travel controller and detecting that the control state is a state of controlling the second actuator by the second controller.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
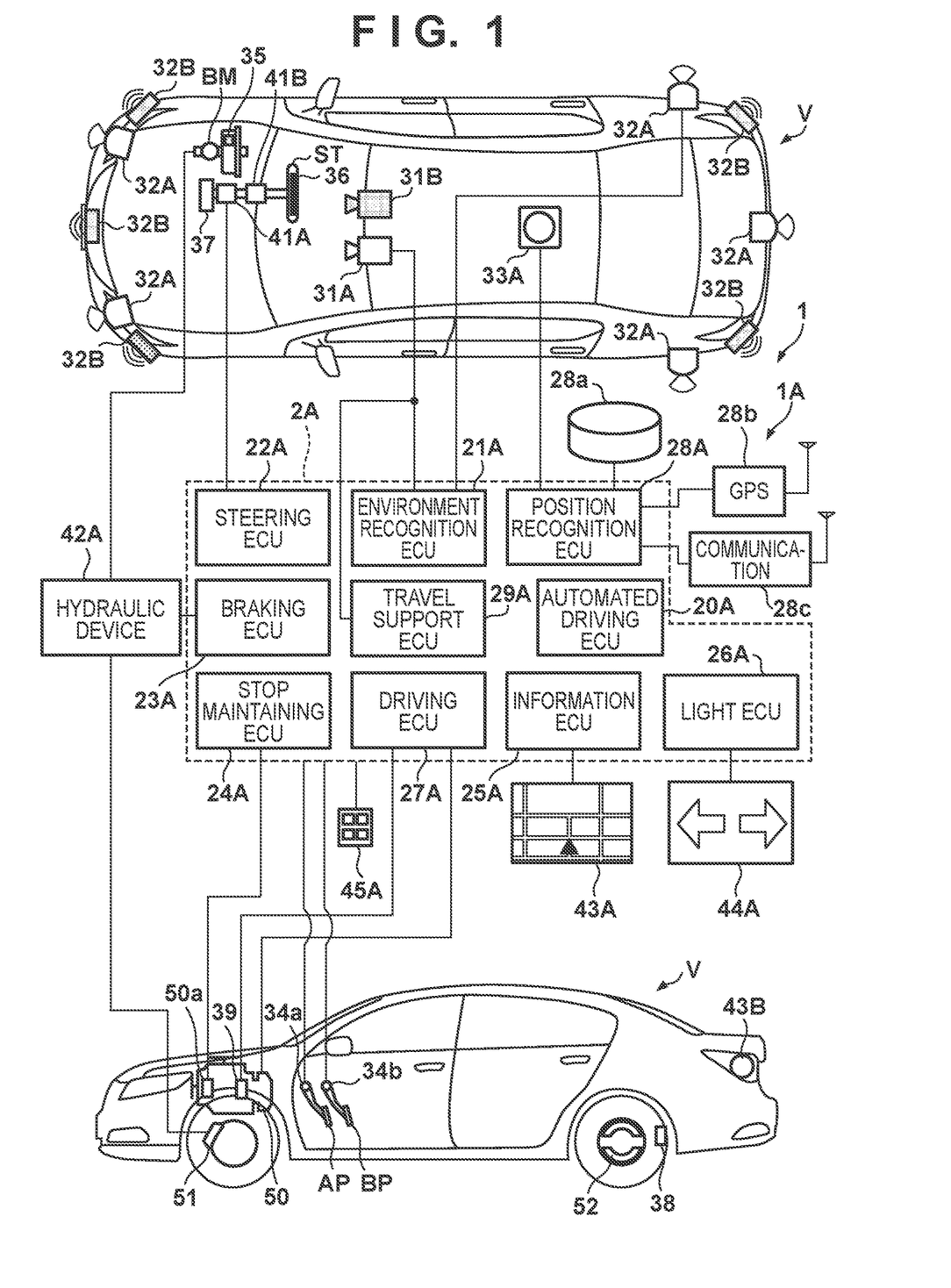
FIG. 1 is a block diagram of a vehicle control apparatus according to an embodiment.
Figure 2:
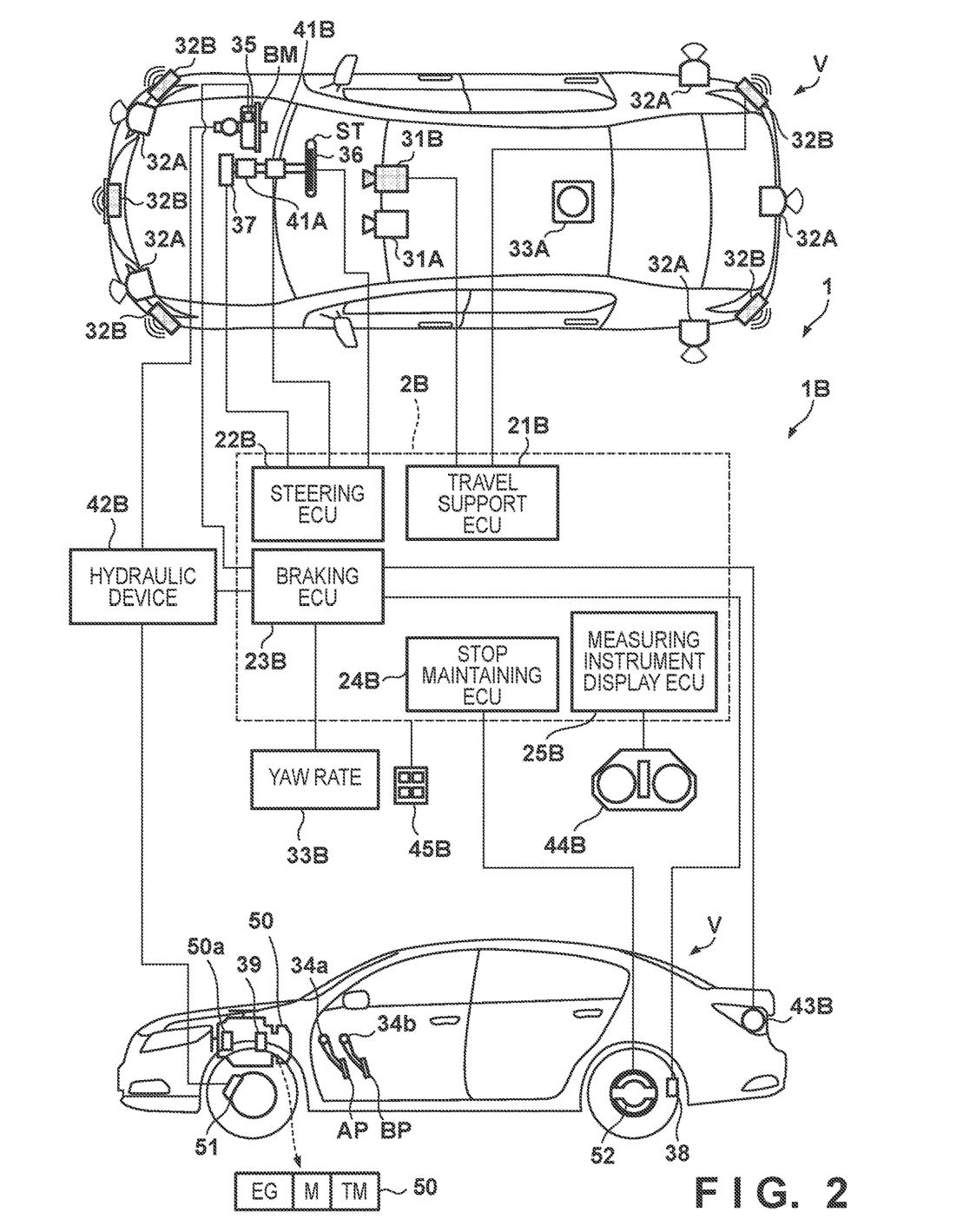
FIG. 2 is a block diagram of the vehicle control apparatus according to the embodiment.
Figure 3:
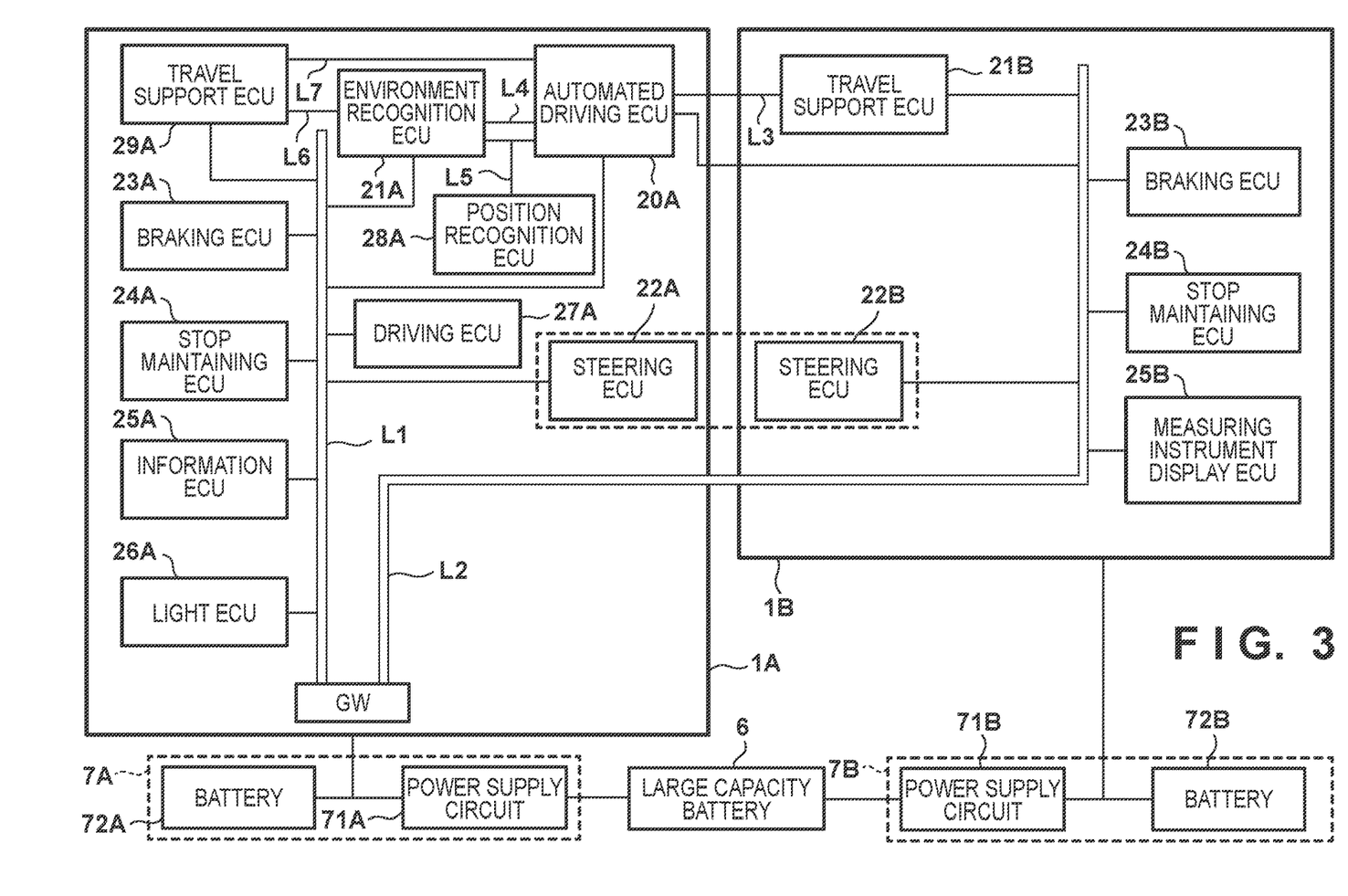
FIG. 3 is a block diagram of the vehicle control apparatus according to the embodiment.

FIGS. 1 to 4 are block diagrams of a vehicle control apparatus 1 (control system) according to an embodiment of the present invention. The vehicle control apparatus 1 controls a vehicle V. In each of FIGS. 1 and 2, an outline of the vehicle V is shown in a plan view and a side view. As an example, the vehicle V is a sedan-type four-wheeled vehicle. The vehicle control apparatus 1 includes a first control unit 1A and a second control unit 1B. FIG. 1 is a block diagram showing the arrangement of the first control unit 1A, and FIG. 2 is a block diagram showing the arrangement of the second control unit 1B. FIG. 3 mainly shows the arrangement of communication lines between the first control unit 1A and the second control unit 1B and power supplies.

The first control unit 1A and the second control unit 1B make some functions implemented by the vehicle V multiplexed or redundant. This can improve the reliability of the vehicle control apparatus. The first control unit 1A performs, for example, not only automated driving control and normal operation control in manual driving but also travel support control concerning emergency avoidance and the like. The second control unit 1B mainly performs travel support control concerning emergency avoidance and the like. Travel support will be sometimes referred to as driving support. The first control unit 1A and the second control unit 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

<First Control Unit 1A>

The arrangement of the first control unit 1A will be described with reference to FIG. 1. The first control unit 1A includes an ECU group (control unit group) 2A. The ECU group 2A includes a plurality of ECUs 20A to 29A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as travel control of the vehicle V. In automated driving, at least one of driving (acceleration of the vehicle V by the power plant 50, and the like), steering, and braking of the vehicle V is automatically performed independently of the driving operation of the driver. In this embodiment, driving, steering, and braking are automatically performed.

The ECU 21A is an environment recognition unit configured to recognize the travel environment of the vehicle V based on the detection results of detection units 31A and 32A that detect the peripheral situation of the vehicle V. The ECU 21A generates target data (to be described later) as peripheral environment information.

In this embodiment, the detection unit 31A is an image capturing device (to be sometimes referred to as the camera 31A hereinafter) configured to detect an object around the vehicle V by image capturing. The camera 31A is provided at the front portion of the roof of the vehicle V to capture the front side of the vehicle V. When images captured by the camera 31A are analyzed, the contour of a target or a division line (a white line or the like) of a lane on a road can be extracted.

In this embodiment, the detection unit 32A is a LiDAR (Light Detection and Ranging) (to be sometimes referred to as the LiDAR 32A hereinafter) configured to detect an object around the vehicle V by light, and detects a target around the vehicle V or measures the distance to a target. In this embodiment, five LiDARs 32A are provided; one at each corner of the front portion of the vehicle V, one at the center of the rear portion, and one on each side of the rear portion. The number of LiDARs 32A and their arrangement can appropriately be selected.

The ECU 29A is a travel support unit configured to execute control associated with travel support (in other words, driving support) as travel control of the vehicle V based on the detection result of the detection unit 31A.

The ECU 22A is a steering control unit configured to control an electric power steering device 41A. The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. The hydraulic device 42A implements, for example, an ESB (Electric Servo Brake). A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M.

The ECU 24A is a stop maintaining control unit configured to control an electric parking lock device 50a provided in the automatic transmission TM. The electric parking lock device 50a includes a mechanism that locks the internal mechanism of the automatic transmission TM mainly when the P range (Park range) is selected. The ECU 24A can control lock and unlock by the electric parking lock device 50a.

The ECU 25A is an in-vehicle notification control unit configured to control an information output device 43A for performing information notification to occupants in the vehicle. The information output device 43A includes, for example, a display device such as a head-up display and a sound output device. The information output device 43A may further include a vibration device. The ECU 25A causes the information output device 43A to output, for example, various kinds of information such as a vehicle speed and an atmospheric temperature and information such as a path guidance.

The ECU 26A is an external notification control unit configured to control an information output device 44A that performs information notification to the outside of the vehicle. In this embodiment, the information output device 44A is a direction indicator (hazard lamp). The ECU 26A controls blinking of the information output device 44A serving as a direction indicator, thereby notifying the outside of the vehicle of the advancing direction of the vehicle V. In addition, the ECU 26A controls blinking of the information output device 44A serving as a hazard lamp to increase the attention of the outside to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the travel state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle so as to be operable by the driver, and accepts input of an instruction or information from the driver.

<Second Control Unit 1B>

The arrangement of the second control unit 1B will be described with reference to FIG. 2. The second control unit 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the travel environment of the vehicle V based on the detection results of detection units 31B and 32B that detect the peripheral situation of the vehicle V, and also serves as a travel support unit configured to execute control associated with travel support (in other words, driving support) as travel control of the vehicle V. The ECU 21B generates target data (to be described later) as peripheral environment information.

Note that in this embodiment, the ECU 21B has the environment recognition function and the travel support function. However, an ECU may be provided for each function, like the ECU 21A and the ECU 29A of the first control unit 1A. Conversely, in the first control unit 1A, the functions of the ECU 21A and the ECU 29A may be implemented by one ECU, like the ECU 21B.

In this embodiment, the detection unit 31B is an image capturing device (to be sometimes referred to as the camera 31B hereinafter) configured to detect an object around the vehicle V by image capturing. The camera 31B is provided at the roof front portion in the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B. The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B via a communication line L2 (to be described later), and the electric power steering device 41B can be controlled based on the detection result of the steering angle sensor 37. The ECU 22B can obtain the detection result of a grip sensor 36 that detects whether the driver is gripping the steering wheel ST, and can monitor the steering wheel gripping state of the driver.

The ECU 23B is a braking control unit configured to control a hydraulic device 42B. The hydraulic device 42B implements, for example, VSA (Vehicle Stability Assist). A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, the wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and an ABS function, traction control, and the posture control function for the vehicle V are implemented based on the detection results of these sensors. For example, the ECU 23B adjusts the braking force of each wheel based on the detection result of the wheel speed sensor 38 provided in each of the four wheels, thereby suppressing the skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external alarm control unit configured to control an information output device 43B that alarms information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can perform control to lock and unlock the rear wheels by the electric parking brake devices 52.

The ECU 25B is an in-vehicle alarm control unit configured to control an information output device 44B that alarms information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle so as to be operable by the driver, and accepts input of an instruction or information from the driver.

<Communication Lines>

An example of communication lines of the vehicle control apparatus 1, which communicably connect the ECUs, will be described with reference to FIG. 3. The vehicle control apparatus 1 includes communication lines L1 to L7 of wired communication. The ECUs 20A to 27A and 29A of the first control unit 1A are connected to the communication line L1. Note that the ECU 28A may also be connected to the communication line L1.

The ECUs 21B to 25B of the second control unit 1B are connected to the communication line L2. The ECU 20A of the first control unit 1A is also connected to the communication line L2. The communication line L3 connects the ECU 20A and the ECU 21B. The communication line L4 connects the ECU 20A and the ECU 21A. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speed, a communication amount, and durability. For example, the communication lines L3 and L4 may be Ethernet® from the viewpoint of communication speed. For example, the communication lines L1, L2, and L5 to L7 may be CAN.

The first control unit 1A includes a gateway GW. The gateway GW relays the communication line L1 and the communication line L2. For this reason, for example, the ECU 21B can output a control instruction to the ECU 27A via the communication line L2, the gateway GW, and the communication line L1.

<Power Supply>

The power supply of the vehicle control apparatus 1 will be described with reference to FIG. 3. The vehicle control apparatus 1 includes a large capacity battery 6, a power supply 7A, and a power supply 7B. The large capacity battery 6 is a battery used to drive the motor M and charged by the motor M.

The power supply 7A is a power supply that supplies power to the first control unit 1A, and includes a power supply circuit 71A and a battery 72A. The power supply circuit 71A is a circuit that supplies the power of the large capacity battery 6 to the first control unit 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the first control unit 1A even in a case in which the power supply of the large capacity battery 6 or the power supply circuit 71A is shut down or lowers.

The power supply 7B is a power supply that supplies power to the second control unit 1B, and includes a power supply circuit 71B and a battery 72B. The power supply circuit 71B is a circuit that is similar to the power supply circuit 71A and supplies the power of the large capacity battery 6 to the second control unit 1B. The battery 72B is a battery similar to the battery 72A, and is a lead battery of, for example, 12 V. Since the battery 72B is provided, the power can be supplied to the second control unit 1B even in a case in which the power supply of the large capacity battery 6 or the power supply circuit 71B is shut down or lowers.

<Overall Arrangement>

Figure 4:
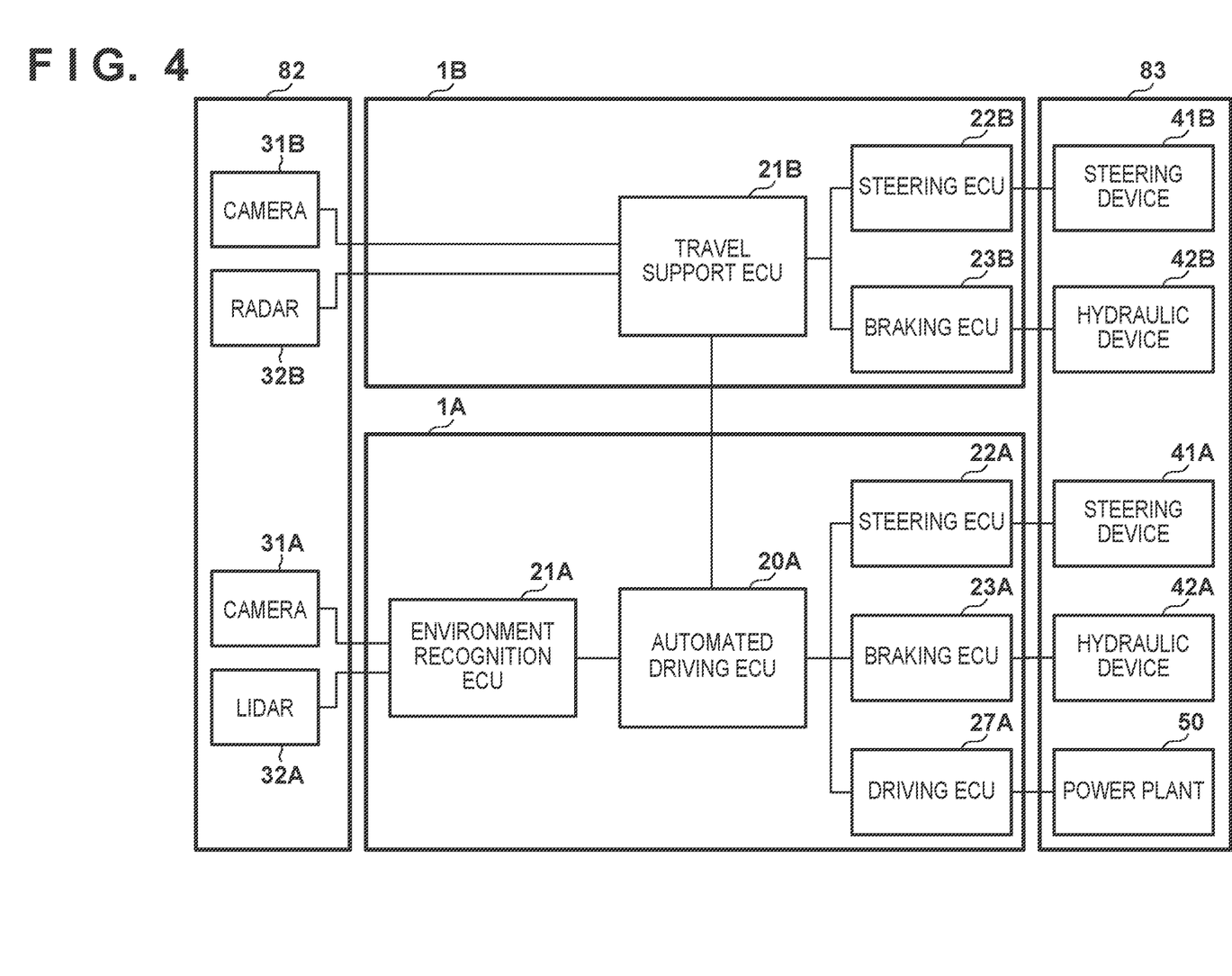
FIG. 4 is a block diagram of the vehicle control apparatus according to the embodiment.

The overall arrangement of the vehicle V will be described from another viewpoint with reference to FIG. 4. The vehicle V includes the first control unit 1A, the second control unit 1B, an external recognition device group 82, and an actuator group 83. In FIG. 4, the ECU 20A, the ECU 21A, the ECU 22A, the ECU 23A, and the ECU 27A are exemplified as the ECUs which are included in the first control unit 1A, and the ECU 21B, the ECU 22B, and the ECU 23B are exemplified as the ECUs which are included in the second control unit 1B.

The external recognition device group 82 is a set of external recognition devices (sensors) mounted on the vehicle V. The external recognition device group 82 includes the above-described cameras 31A and 31B, LiDAR 32A, and radar 32B. In this embodiment, the camera 31A and the LiDAR 32A are connected to the ECU 21A of the first control unit 1A, and operate in accordance with the instructions from the ECU 21A (that is, are controlled by the first control unit 1A). The ECU 21A acquires pieces of external information obtained by the camera 31A and the LiDAR 32A and supplies the pieces of external information to the ECU 20A of the first control unit 1A. Also, the camera 31B and the radar 32B are connected to the ECU 21B of the second control unit 1B, and operate in accordance with the instructions from the ECU 21B (that is, are controlled by the second control unit 1B). The ECU 21B acquires pieces of external information obtained by the camera 31B and the radar 32B, and supplies the pieces of external information to the ECU 20A of the first control unit 1A. This allows the first control unit 1A (the ECU 20A) to execute automated driving control using the pieces of external information obtained from each of the cameras 31A and 31B, the LiDAR 32A, and the radar 32B.

The actuator group 83 is a set of actuators mounted on the vehicle V. The actuator group 83 includes, for example, the electric power steering device 41A, the electric power steering device 41B, the hydraulic device 42A, the hydraulic device 42B, and the power plant 50 described above. Each of the electric power steering device 41A and the electric power steering device 41B is a steering actuator for steering the vehicle V. Each of the first hydraulic device 42A and the second hydraulic device 42B is a braking actuator for performing braking of the vehicle V. In addition, the power plant 50 is a driving actuator for driving the vehicle V.

In this embodiment, the electric power steering device 41A, the first hydraulic device 42A, and the power plant 50 are connected to the ECU 20A via the ECU 22A, the ECU 23A, and the ECU 27A, respectively, and operate in accordance with the instructions from the ECU 20A (that is, are controlled by the first control unit 1A). In addition, the electric power steering device 41B and the second hydraulic device 42B are connected to the ECU 21B via the ECU 22B and the ECU 23B, respectively, and operate in accordance with the instructions from the ECU 21B (that is, are controlled by the second control unit 1B).

The first control unit 1A (the ECU 20A) communicates with some of the devices (the camera 31A and the LiDAR 32A) of the external recognition device group 82 via a communication path, and communicates with some of the devices (for example, the electric power steering device 41A, the hydraulic device 42A, and the power plant 50) of the actuator group 83 via another communication path. Also, the second control unit 1B (the ECU 21B) communicates with some of the devices (the camera 31B and the radar 32B) of the external recognition device group 82 via a communication path, and communicates with some of the devices (for example, the electric power steering device 41B and the hydraulic device 42B) of the actuator group 83 via another communication path. The communication path connected to the ECU 20A and the communication path connected to the ECU 21B may be different from each other. These communication paths may be, for example, CAN (Controller Area Network) or Ethernet®. The ECU 20A and the ECU 21B are connected to each other via a communication path. This communication path may be, for example, CAN (Controller Area Network) or Ethernet®. Alternatively, the ECUs may be connected by both CAN and Ethernet®.

The first control unit 1A (the ECU 20A) is formed by a processor such as a CPU or the like and a memory such as a RAM or the like, and is formed to be able to execute travel control (for example, automated driving control) of the vehicle V. For example, the ECU 20A acquires, as the pieces of external information obtained by the external recognition device group 82, the pieces of external information obtained by the camera 31A and the LiDAR 32A via the ECU 21A and the pieces of external information obtained by the camera 31B and the radar 32B via the ECU 21B. The ECU 20A generates, based on the acquired pieces of external information, a path to be taken by vehicle V and a speed at which the vehicle V is to travel during an automated driving operation, and determines target control amounts (a driving amount, a braking amount, and a steering amount) of the vehicle V for implementing this path and this speed. The ECU 20A generates, based on the determined target control amounts of the vehicle V, operation amounts (instruction values (signal values) of voltages, currents, or the like) of the respective actuators, and controls the actuator group 83 (the electric power steering device 41A, the first hydraulic device 42A, and the power plant 50) based on the operation amounts to perform travel control (for example, automated driving) of the vehicle V.

The ECU 20A can operate here as a detection unit, of the first control unit 1A, which detects the degradation of the travel control function of the vehicle V. For example, the ECU 20A can detect the degradation of the travel control function by monitoring the communication state of the communication path to the external recognition device group 82 and the communication state of the communication path to the actuator group 83 and detecting the degradation of the communication function with the external recognition device group 82 and the actuator group 83 based on these communication states. The degradation of the communication function can include the disconnection of communication, a reduction in the communication speed, and the like. The ECU 20A may also detect the degradation of the travel control function by detecting the degradation of the external detection performance of the external recognition device group 82 and the degradation of the driving performance of the actuator group 83. Furthermore, if the ECU 20A has been formed to diagnose its own processing performance (for example, the processing speed or the like), the ECU 20A may detect the degradation of the travel control function based on the result of this diagnosis. Note that although the ECU 20A operates as a detection unit that can detect its own travel function degradation in this embodiment, the present invention is not limited to this. The detection unit may be provided separately from the ECU 20A or the second control unit 1B (for example, the ECU 21B) may operate as the detection unit.

The second control unit 1B (the ECU 21B) is formed by a processor such as a CPU or the like and a memory such as a RAM or the like, and is formed to be able to execute travel control of the vehicle V. In a similar manner to the ECU 20A of the first control unit 1A, the ECU 21B can determine the target control amounts (the braking amount and the steering amount) of the vehicle V, generate the operation amounts of the respective actuators based on the determined target control amounts, and control the actuator group 83 (the electric power steering device 41B and the second hydraulic device 42B) based on the operation amounts. However, the processing performance for executing travel control of the vehicle V of the ECU 21B is lower than that of the ECU 20A. The processing performance can be compared based on, for example, the clock count or a benchmark test result. The ECU 21B will acquire the pieces of external information obtained by the camera 31B and the radar 32B and supply the pieces of external information to the ECU 20A during a normal state in which the degradation of the travel control function is not detected in the ECU 20A. However, the ECU 21B will perform travel control (that is, perform alternative control) of the vehicle V instead of the ECU 20A if the degradation of the travel control function is detected in the ECU 20A. Alternative control can include, for example, degeneracy control (fallback control) in which in accordance with the automated driving control level of the vehicle V, a function restriction of degrading the control level is executed. In addition, the ECU 20A will perform the degeneracy control in accordance with the functional degradation of the ECU 21B. The functional degradation of the ECU 21B in this case can include, for example, the functional degradation of the camera 31B and the radar 32B which are controlled by the second control unit 1B.

<Control Example>

As described above, in the vehicle control apparatus 1 according to this embodiment, in a case in which the degradation of the travel control function is detected in the first control unit 1A that is executing the automated driving control, the second control unit 1B will perform travel control (alternative control) of the vehicle V instead of the first control unit 1A. By providing a redundant arrangement that includes a plurality of control units, the reliability of automated driving control of the vehicle can be improved.

A case in which the performer of control (the control performer) is switched from the first control unit 1A to the second control unit 1B will be considered. As shown with reference to FIG. 4, the first control unit 1A and the second control unit 1B are communicably connected to each other by the ECU 20A and the ECU 21B, and exchanges various kinds of data with each other. In this arrangement, in a case in which the transmission of the signal from the first control unit 1A has stopped, the second control unit 1B will assume that the travel control function by the first control unit 1A has degraded, and start the alternative control. A failure in the communication line (for example, L3) between the automated driving ECU 20A and the travel support ECU 21B, functional degradation due to a failure in the power supply to the first control unit 1A, or the like can be raised as a cause of this suspension of signal transmission in this case.

On the other hand, if signal transmission from the first control unit 1A to the second control unit 1B stops due to a functional degradation or a failure in the communication line between the first control unit 1A and the second control unit 1B, it can be assumed that the first control unit 1A itself is operating normally and is continuing to perform the travel control. Even in such a case, the second control unit 1B will determine that it has become impossible for the first control unit 1A to perform the travel control, and the second control unit 1B will start the alternative control. As a result, the travel control will be performed by both the first control unit 1A and the second control unit 1B, and wasteful control operations will be performed.

Figure 5:
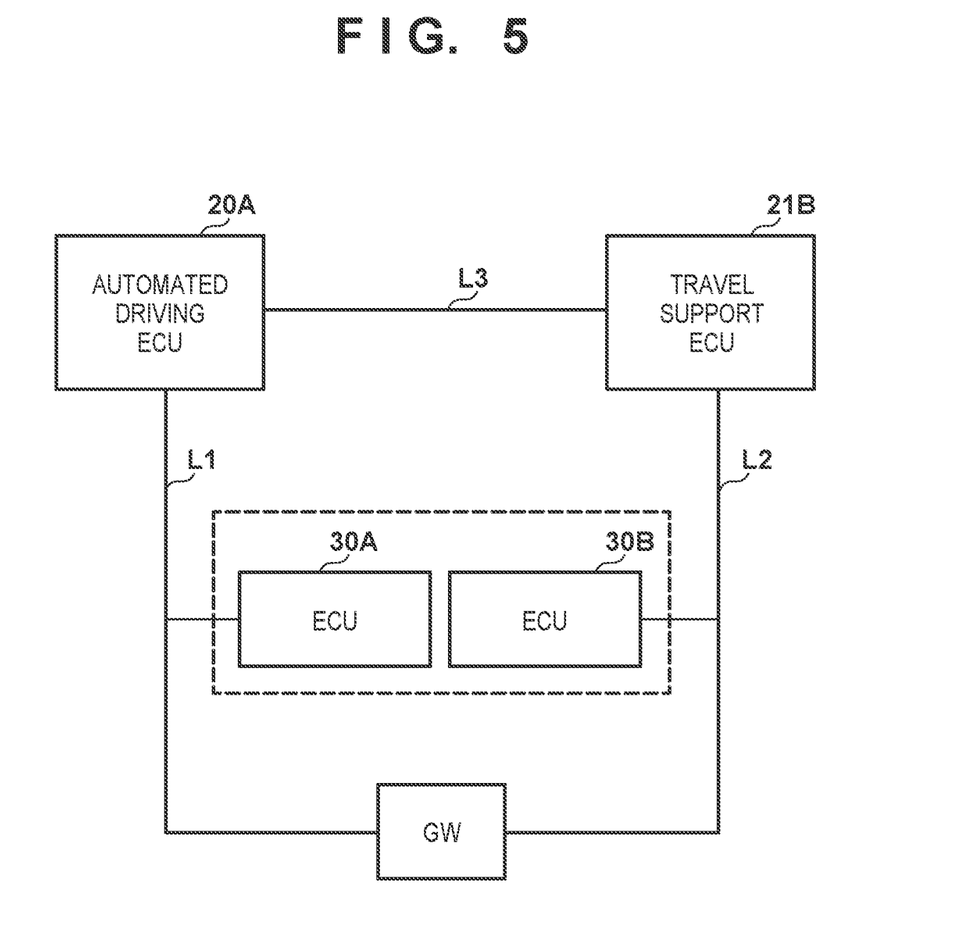
FIG. 5 is a block diagram showing the connection outline of communication lines according to the embodiment.

Hence, in the present invention, a vehicle that includes a redundant arrangement for executing travel control will include an arrangement that appropriately switches the performer of processing that can execute the travel control. The arrangement according to the present invention will be described with reference to FIG. 5. FIG. 5 is a schematic view in which a portion according to this embodiment has been extracted in the arrangement shown in FIGS. 3 and 4. In FIG. 5, an ECU 30A and an ECU 30B are ECUs which have been arranged redundantly to perform travel control, and each of these ECUs is arranged to be able to control the actuator group.

In this embodiment, the automated driving ECU 20A and the travel support ECU 21B are communicably connected to each other via the communication line L3. The automated driving ECU 20A is connected to the ECU 30A that controls the actuator group and the gateway GW via the communication line L1. The automated driving ECU 20A issues control instructions to the travel support ECU 21B and the ECU 30A. The automated driving ECU 20A also acquires pieces of information related to the operation of the travel support ECU 21B and the operation of the ECU 30A at appropriate times. The automated driving ECU 20A can acquire the information related to the ECU 30B via the travel support ECU 21B and the gateway GW.

The travel support ECU 21B is connected, via the communication line L2, to the ECU 30B that controls the actuator group and the gateway GW. The travel support ECU 21B issues a control instruction to the ECU 30B. In this embodiment, if it is determined travel control cannot be executed by the automated driving ECU 20A, the travel support ECU 21B will execute travel control as alternative control. As described above, although the communication lines L1 and L2 may be CAN and the communication line L3 may be Ethernet®, the communication lines may be formed by using a redundant arrangement of a plurality of communication lines or a combination of CAN and Ethernet®.

In this embodiment, the ECU 30A and the ECU 30B can switch their respective control states in accordance with whichever is to control the actuator group. If the operation of the automated driving ECU 20A cannot be confirmed such as in a case in which a control instruction or a signal cannot be received from the automated driving ECU 20A, the ECU 30A will shift to a control state in which control of the actuator group is performed by the ECU 30B. For example, the ECU 30A may notify the ECU 30B to perform control of the actuator group when the operation of the automated driving ECU 20A cannot be confirmed. As a result, the ECU 30B will shift to a state in which it can control the actuator group, and will control the actuator group based on the control instruction from the travel support ECU 21B. On the other hand, if it is detected that the automated driving ECU 20A is operating normally, the ECU 30A will shift to a state in which it can control the actuator group. Alternatively, the ECU 30A and the ECU 30B may mutually monitor their respective operation states, and the performer of the operation of the actuator group may be switched between them in accordance with their respective operation states. For example, the ECU 30B may monitor the signal from the ECU 30A and shift to a state for executing control of the actuator group when this signal cannot be received. Note that another signal line for exchanging signals may be arranged between the ECU 30A and the ECU 30B.

<Switching Operation>

FIGS. 6A to 6D are views for explaining the procedure of switching the performer of control according to the embodiment of the present invention. Although only portions necessary for the description are illustrated here in a manner similar to FIG. 5, each ECU may be able to communicate with and monitor other components.

Figure 6A:
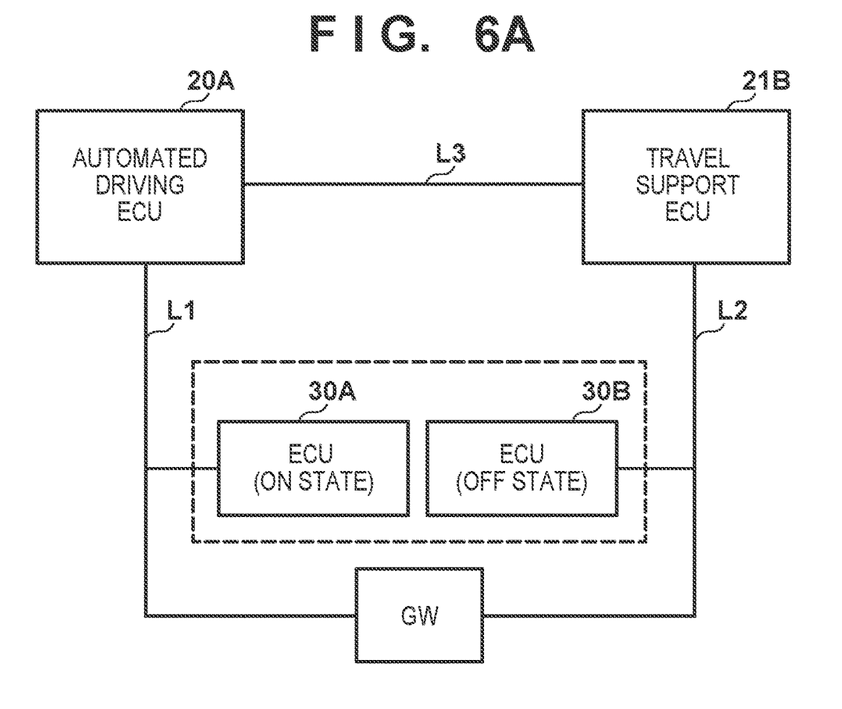
FIGS. 6A to 6D are views for explaining a switching operation according to the embodiment.

FIG. 6A shows a state in which the automated driving ECU 20A and the travel support ECU 21B are operating normally. Also, the ECU 30A is in a state (ON state) in which it is performing the control of the actuator group, and the ECU 30B is in a state (OFF state) in which it is not performing the control of the actuator group.

Figure 6B:
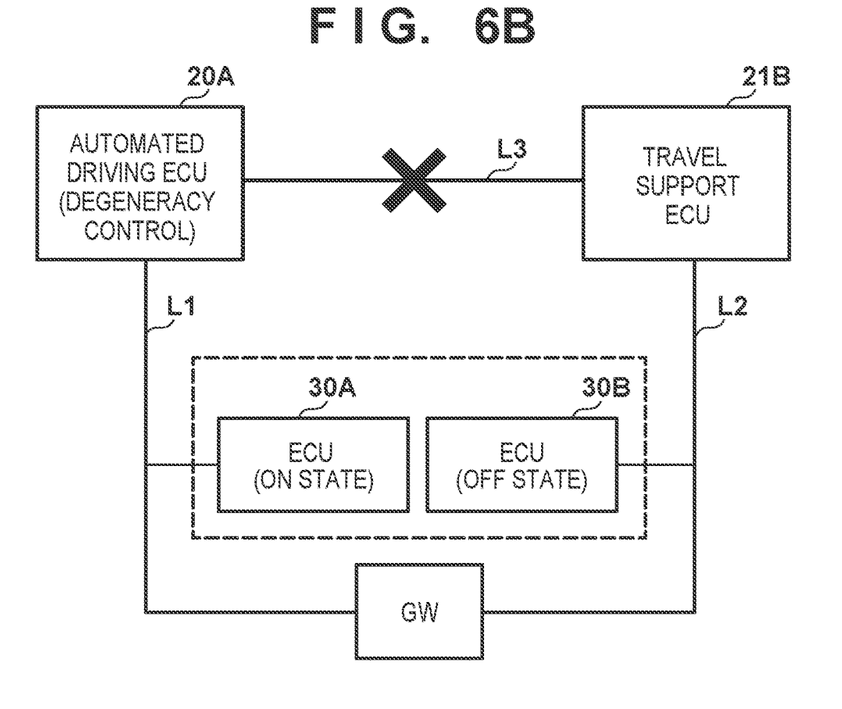

FIG. 6B shows a state in which a communication failure has occurred in the communication line L3 from the state of FIG. 6A. At this time, assume that the automated driving ECU 20A and the travel support ECU 21B are operating normally. If the control state changes to this state, automated driving ECU 20A will start the degeneracy control. Alternatively, it may be arranged so that the degeneracy control will be started when a predetermined time has elapsed since the control state has changed to the state of FIG. 6B. Since the automated driving ECU 20A can acquire the state information of each component on the side of the second control unit 1B via the gateway GW in this state, the degeneracy control may be performed based on this state information. In this case, the ECU 30A will be in the state (ON state) in which it is performing the control of the actuator group, and the ECU 30B will be in the state (OFF state) in which it is not performing the control of the actuator group.

Figure 6C:
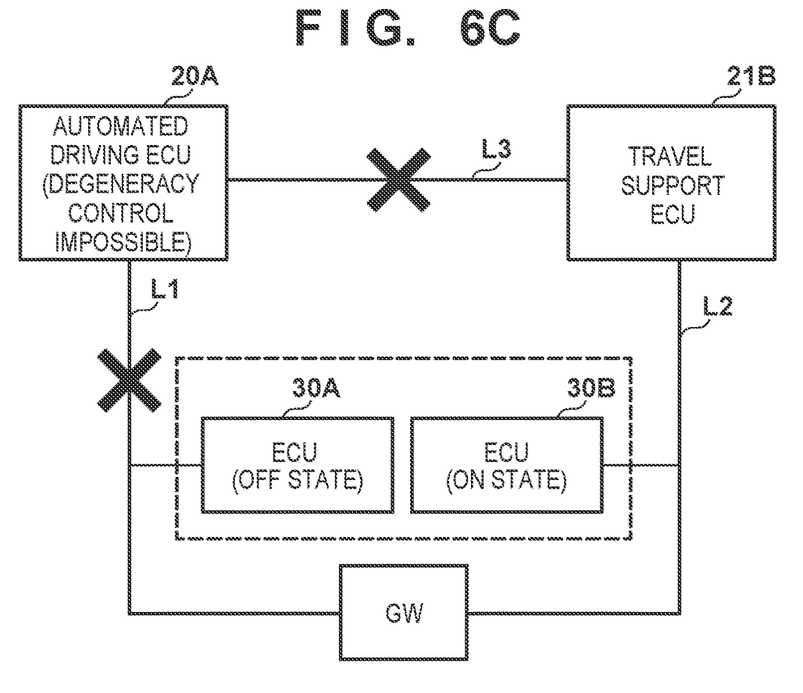

FIG. 6C shows a state in which a communication failure has further occurred in the communication line L1 from the state of FIG. 6B. When the control state changes to this this state, it will be assumed that control cannot be performed by the automated driving ECU 20A, and the performer of control of the actuator group is switched from the ECU 30A to the ECU 30B.

Figure 6D:
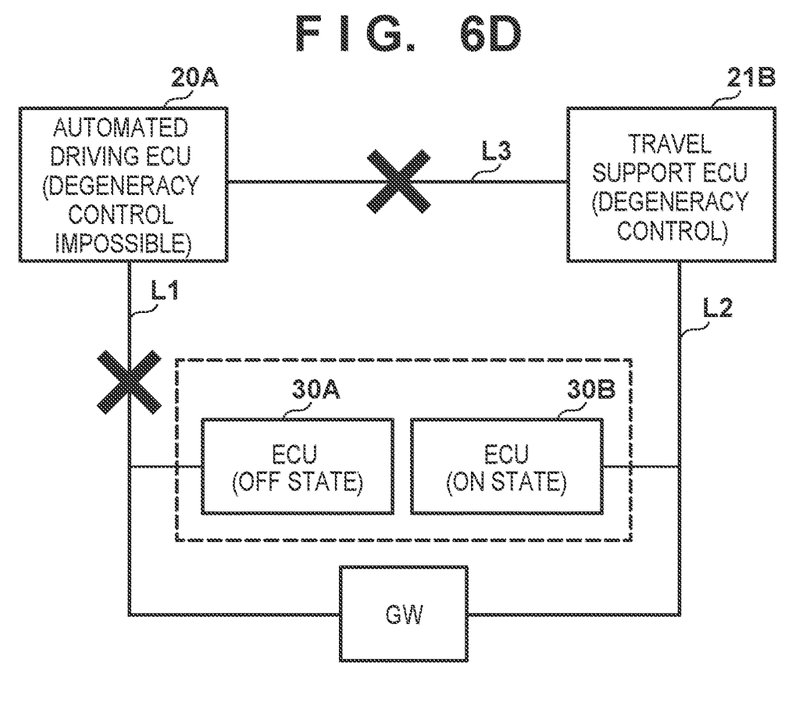

FIG. 6D shows a state in which the performer of processing of the degeneracy control as changed to the travel support ECU 21B after the state of FIG. 6C. The travel support ECU 21B will start executing the degeneracy control processing when it has detected that the communication with the automated driving ECU 20A cannot be performed and the performer of control of the actuator group has switched to the ECU 30B.

<Processing Procedure>

Figure 7:
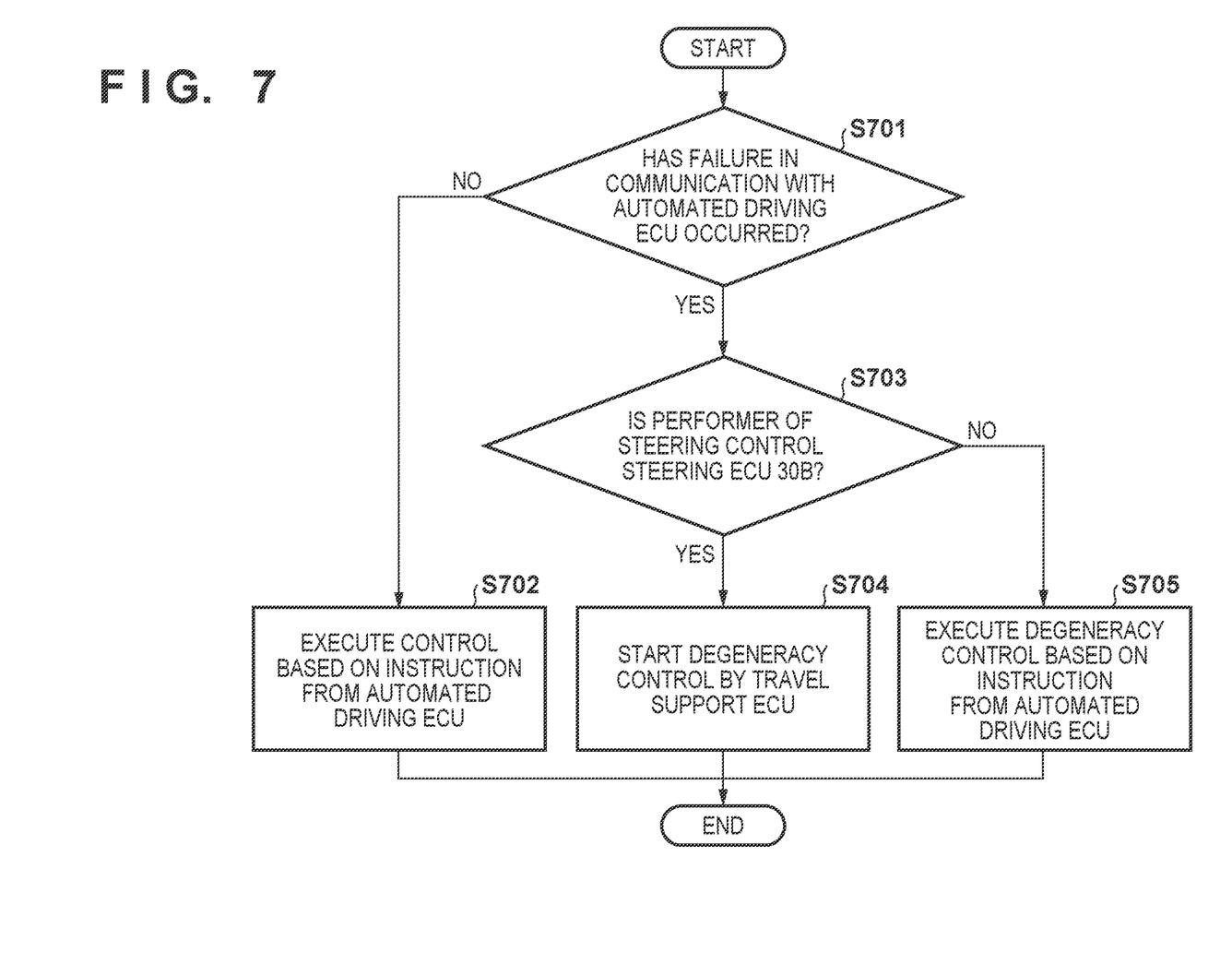
FIG. 7 is a flowchart of processing according to the embodiment.

FIG. 7 is a flowchart showing the processing procedure of the travel support ECU 21B according to the embodiment of the present invention. Note that although the travel support ECU 21B is described to be the performer of processing here, the performer of processing is not limited to this ECU since it is sufficient as long as the processing is performed by an ECU on the side of the second control unit 1B. This processing procedure can be continuously executed while the vehicle V operates.

In step S701, the travel support ECU 21B determines whether communication with the automated driving ECU 20A has failed. The failure of communication in this case corresponds to, for example, the occurrence of a communication failure in the communication line L3 shown in FIG. 6B. If it is determined that the communication failure has occurred (YES in step S701), the process advances to step S703. If it is determined that the communication failure has not occurred (NO in step S701), the process advances to step S702. Note that a communication failure may include, in addition to communication disconnection, the degradation of the communication function and the like.

In step S702, the travel support ECU 21B controls each component on the side of the second control unit 1B in accordance with the instruction from the automated driving ECU 20A. Subsequently, the processing procedure ends.

In step S703, the travel support ECU 21B determines whether the performer of control of the actuator group has been set to the ECU 30B. As described in FIGS. 6A to 6D, if it is determined that the degeneracy control cannot be performed by the automated driving ECU 20A in the ECU 30A positioned on the side of the first control unit 1A, the performer of control of the actuator group is switched from the ECU 30A to the ECU 30B. If it is determined that the performer of control of the actuator group is set to the ECU 30B (YES in step S703), the process advances to step S704. Otherwise (NO in step S703), the process advances to step S705.

In step S704, the travel support ECU 21B starts executing the degeneracy control by its ECU upon determining that the degeneracy control cannot be performed under the control by the automated driving ECU 20A (that is, the first control unit 1A). Subsequently, the processing procedure ends.

In step S705, the travel support ECU 21B performs the degeneracy control of each component on the side of the second control unit 1B in accordance with the instruction from the automated driving ECU 20A. In this case, for example, a control signal may be received from the first control unit 1A via the gateway GW. Subsequently, the processing procedure ends.

As described above, according to this embodiment, simultaneous execution of travel control operations by travel control units can be suppressed in a vehicle that has a redundant arrangement.

Note that in the above-described example, the ECU 30A and the ECU 30B may be, for example, the steering ECUs 22A and 22B for controlling the electric power steering devices 41A and 41B, respectively, or may be the braking ECUs 23A and 23B for controlling the hydraulic devices 42A and 42B, respectively. The present invention is applicable as long as a relationship that has a redundant arrangement such as the first control unit 1A and the second control unit 1B is present.

SUMMARY OF EMBODIMENT

1. A vehicle control apparatus of the above-described embodiment is a vehicle control apparatus (for example, 1) that controls automatic driving of a vehicle (for example, V), comprising:

a first travel controller (for example, 1A, 20A) configured to control travel of the vehicle;

a second travel controller (for example, 1B, 21B) configured to control travel of the vehicle based on an instruction from the first travel controller;

a first controller (for example, 30A) configured to control a first actuator based on an instruction from the first travel controller; and a second controller (for example, 30B) configured to control a second actuator based on an instruction from the second travel controller, wherein a control performer of an actuator group including the first actuator and the second actuator is switched between the first controller and the second controller in accordance with a state of the first travel controller, and in a case in which degradation of a communication function between the first travel controller and the second travel controller is detected in a state where the actuator group is performed by the second controller, alternative control of the vehicle is performed by the second travel controller.

According to this embodiment, simultaneous execution of travel control operations by travel controllers can be suppressed in a vehicle that has a redundant arrangement.

2. In the above-described embodiment, the alternative control is degeneracy control of the automated driving of the vehicle.

According to this embodiment, the second travel controller can perform degeneracy control of automated driving of the vehicle instead of the first travel controller.

3. In the above-described embodiment, in a case in which the degradation of the communication function between the first travel controller and the second travel controller is detected in a state where the actuator group is performed by the first controller, degeneracy control of the automated driving of the vehicle is performed by the first travel controller.

According to this embodiment, even in a case in which the degradation of the communication function between the first travel controller and the second travel controller is detected, if the control state of the actuator is in a state to be performed by the first controller, degeneracy control will continue to be performed by the first travel controller, and travel control by the second travel controller will be suppressed.

4. In the above-described embodiment, the first travel controller and the second travel controller are connected by a first communication line (for example, L3) and a second communication line (for example, L1, L2, GW) which is different from the first communication line, and in a case in which degradation of communication functions in the first communication line and the second communication line is detected in a state where the actuator group is performed by the second controller, the alternative control of the vehicle is performed by the second travel controller.

According to this embodiment, in a case in which the first travel controller and the second travel controller are connected by communication lines with a redundant arrangement and the communication function of one of the communication lines has degraded, it is possible to determine whether alternative control is to be performed by the second travel controller.

5. In the above-described embodiment, the actuator group includes an actuator of a device related to one of steering and braking.

According to this embodiment, control related to steering or braking can be appropriately switched.

6. A vehicle control method of the above-described embodiment is a vehicle control method for controlling automated driving of a vehicle (for example, V) that comprises a first travel controller (for example, 1A, 20A) configured to control travel of the vehicle, a second travel controller (for example, 1B, 21B) configured to control travel of the vehicle based on an instruction from the first travel controller, a first controller (for example, 30A) configured to control a first actuator based on an instruction from the first travel controller, and a second controller (for example, 30B) configured to control a second actuator based on an instruction from the second travel controller, wherein a control performer of an actuator group including the first actuator and the second actuator is switched between the first controller and the second controller in accordance with a state of the first travel controller, and in a case in which degradation of a communication function between the first travel controller and the second travel controller is detected in a state where the actuator group is performed by the second controller, alternative control of the vehicle is performed by the second travel controller.

According to this embodiment, simultaneous execution of travel control operations by travel controllers can be suppressed in a vehicle that has a redundant arrangement.

The invention is not limited to the foregoing embodiments, and various variations/changes are possible within the spirit of the invention.

What is claimed is:

1. A vehicle control apparatus that controls automated driving of a vehicle, comprising:
   a first travel controller configured to perform travel control of the vehicle, the travel control including control of steering and acceleration/deceleration of the vehicle;
   a second travel controller configured to perform recognition of a peripheral travel environment of the vehicle and driving support of the vehicle;
   a first controller configured to control a first actuator based on an instruction from the first travel controller; and
   a second controller configured to control a second actuator based on an instruction from the second travel controller,
   wherein the first controller gives, to the second controller, notification for switching a control state from control of the first actuator by the first controller to control of the second actuator by the second controller, in a case where the instruction from the first travel controller cannot be received by the first controller, and
   wherein the second travel controller performs alternative control of the vehicle, in a case of detecting degradation of a communication function of the second travel controller with the first travel controller and detecting that the control state comprises the second controller controlling the second actuator and not the first controller controlling the first actuator, and
   wherein the first travel controller performs degeneracy control for performing a function restriction related to control of the automated driving of the vehicle, in a case of detecting degradation of a communication function with the second travel controller.

2. The vehicle control apparatus according to claim 1, wherein the alternative control is an alternative control for performing a function restriction related to control of the automated driving of the vehicle.

3. The vehicle control apparatus according to claim 1, wherein the first travel controller and the second travel controller are connected by a first communication line and a second communication line which is different from the first communication line, and the second travel controller performs the alternative control of the vehicle by controlling the second actuator, in a case of detecting degradation of communication functions in the first communication line and the second communication line and detecting that the control state is a state of controlling the second actuator by the second controller.

4. The vehicle control apparatus according to claim 1, wherein each of the first actuator and the second actuator is an actuator related to steering or braking of the vehicle.

5. The vehicle control apparatus according to claim 1, wherein
   to the first actuator, power is supplied via a first power supply circuit, and
   to the second actuator, power is supplied via a second power supply circuit different from the first power supply circuit.

6. The vehicle control apparatus according to claim 1, wherein
   to the first actuator, power is supplied from a first power supply, and
   to the second actuator, power is supplied from a second power supply different from the first power supply.

7. The vehicle control apparatus according to claim 1, wherein
   the first controller detects, via a relay unit, a state of controlling the second actuator by the second controller, and
   the second controller detects, via the relay unit, a state of controlling the first actuator by the first controller.

8. A vehicle control method for controlling automated driving of a vehicle, comprising:
   a first travel controller configured to perform travel control of the vehicle, the travel control including control of steering and acceleration/deceleration of the vehicle,
   a second travel controller configured to perform recognition of a peripheral travel environment of the vehicle and driving-support of the vehicle,
   a first controller configured to control a first actuator based on an instruction from the first travel controller, and
   a second controller configured to control a second actuator based on an instruction from the second travel controller,
   wherein the first controller gives, to the second controller, notification for switching a control state from control of the first actuator by the first controller to control of the second actuator by the second controller, in a case where the instruction from the first travel controller cannot be received by the first controller, and
   wherein the second travel controller performs alternative control of the vehicle, in a case of detecting degradation of a communication function of the second travel controller with the first travel controller and detecting that the control state comprises the second controller controlling the second actuator and not the first controller controlling the first actuator, and
   wherein the second travel controller does not perform the alternative control in a case of detecting that the control state is a state of controlling the first actuator by the first controller, even if detecting the degradation of the communication function with the first travel controller.

* * * * *